(12) United States Patent
Odaguchi

(10) Patent No.: US 8,549,337 B2
(45) Date of Patent: Oct. 1, 2013

(54) MEMORY CARD CONTROL DEVICE AND METHOD FOR CONTROLLING THE SAME

(75) Inventor: Hirofumi Odaguchi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 440 days.

(21) Appl. No.: 12/666,541

(22) PCT Filed: Nov. 13, 2008

(86) PCT No.: PCT/JP2008/071057
§ 371 (c)(1),
(2), (4) Date: Dec. 23, 2009

(87) PCT Pub. No.: WO2009/064017
PCT Pub. Date: May 22, 2009

(65) Prior Publication Data
US 2010/0325455 A1 Dec. 23, 2010

(30) Foreign Application Priority Data

Nov. 15, 2007 (JP) .................................. 2007-296556
Oct. 30, 2008 (JP) .................................. 2008-279610

(51) Int. Cl.
*G06F 1/26* (2006.01)
*G06F 1/32* (2006.01)

(52) U.S. Cl.
USPC ........................................................ 713/320

(58) Field of Classification Search
USPC ........................................................ 713/320
See application file for complete search history.

(56) References Cited

U.S. PATENT DOCUMENTS

| | | | | |
|---|---|---|---|---|
| 4,652,976 A | * | 3/1987 | Fushimoto | 361/679.31 |
| 6,199,764 B1 | * | 3/2001 | Tsai | 235/492 |
| 6,813,654 B1 | * | 11/2004 | Ishibashi | 710/36 |
| 7,103,788 B1 | | 9/2006 | Souza et al. | |
| 2003/0058732 A1 | * | 3/2003 | Nam | 365/233 |
| 2004/0268163 A1 | * | 12/2004 | Yeh | 713/300 |
| 2005/0094001 A1 | * | 5/2005 | Saga | 348/231.99 |
| 2007/0027817 A1 | * | 2/2007 | Hirota et al. | 705/65 |
| 2008/0071963 A1 | * | 3/2008 | Chow et al. | 710/313 |
| 2008/0288098 A1 | * | 11/2008 | Thanos et al. | 700/94 |

FOREIGN PATENT DOCUMENTS

| | | |
|---|---|---|
| JP | 2000-293638 | * 10/2000 |
| JP | 2000-316113 | 11/2000 |
| JP | 2003-280775 | 10/2003 |
| JP | 2004-266674 | 9/2004 |
| JP | 2005-508041 | 3/2005 |
| KR | 10-2005-0004639 | 1/2005 |

OTHER PUBLICATIONS

Apr. 6, 2012 Korean official action (with English translation) in connection with a counterpart Korean patent application.

* cited by examiner

*Primary Examiner* — Mohammed Rehman
(74) *Attorney, Agent, or Firm* — Cooper & Dunham LLP

(57) ABSTRACT

A memory card control device includes an insertion unit to which a memory card is inserted, a memory card controller to control writing and reading of data to/from the memory card inserted in the insertion unit, an interface controller to send and receive the data written or read to/from the memory card to/from a host computer, a clock supplier to supply a clock signal to the memory card controller and the interface controller, a memory card detector to detect presence or absence of the memory card inserted in the insertion unit, and a low power consumption mode switching unit to switch the memory card controller and the interface controller to a low power consumption mode in response to the absence of the memory card detected by the memory card detector.

9 Claims, 4 Drawing Sheets

MEMORY CARD CONTROL DEVICE AND METHOD FOR CONTROLLING THE SAME

TECHNICAL FIELD

The present invention relates to a memory card control device which controls a memory card used by a computer or the like, and to a memory card control method.

BACKGROUND ART

A device controller 100 serving as a conventional memory card control device is shown in FIG. 4. The device controller 100 includes an interface controller 101, a CPU 102, a ROM 103, an internal PLL controller 104, an internal PLL 105, and a memory card controller 106.

The interface controller 101 communicates with a host computer 200 which is externally connected to the device controller 100 to receive data to be written to a memory card and send data read from the memory card.

The CPU 102 controls the interface controller 101 and the memory card controller 106 which is described later. The CPU 102 manages overall control of the device controller 100. The ROM 103 is a read only memory in which software for controlling the CPU 102 is stored in advance.

The internal PLL controller 104 controls the internal PLL 105 which is described later. The internal PLL 105 supplies clock signals in a predetermined frequency to the interface controller 101 and the memory card controller 106.

The memory card controller 106 includes plural card controllers 106₁, 106₂, 106₃, . . . , and 106n, each of which controls writing, reading, and the like of data to/from the memory card inserted in a memory card insertion unit.

The device controller 100 as shown in FIG. 4 is connected to, for example, the host computer 200 through a USB (Universal Serial Bus) interface and controls writing and reading to/from various memory cards to serve as an external memory device of the host computer 200.

The device controller 100 of this kind is sometimes connected to or mounted in a notebook computer serving as a host computer. In such cases, power consumption is an issue.

In a battery-powered notebook computer, power consumption directly affects battery life. In a recent memory card, in particular, capacity has been increasing, a processed data amount has increased to a G (giga) unit, and a data transfer rate has been also increasing. Therefore, there is a concern that more power consumption is expected.

Patent Document 1 discloses a method to solve such a problem. In this method, when a computer detects that a device connected to the computer is in an idle state, the computer sends a function to cause the device to be in a suspended state (in a low power consumption state).
[Patent Document 1] Japanese Patent Application Publication No. 2005-508041

However, since the host computer is required to monitor the state of the device, a monitoring function is required to be added to an OS (operating system), a device driver, or the like on the host computer side.

DISCLOSURE OF THE INVENTION

The invention is made in view of solving the aforementioned problem.

It is an object of at least one embodiment of the invention to automatically cause a memory card control device to be in a low power consumption mode by itself without being controlled by a host computer.

According to one aspect of the invention, a memory card control device includes an insertion unit to which a memory card is inserted, a memory card controller to control writing and reading of data to/from the memory card inserted in the insertion unit, an interface controller to send and receive the data written or read to/from the memory card to/from a host computer, a clock supplier to supply a clock signal to the memory card controller and the interface controller, a memory card detector to detect presence or absence of the memory card inserted in the insertion unit, and a low power consumption mode switching unit to switch the memory card controller and the interface controller to a low power consumption mode in response to the absence of the memory card detected by the memory card detector.

According to another aspect of the invention, there is provided a method for controlling a memory card control device including a memory card controller configured to control writing and reading of data to/from the memory card inserted in an insertion unit and an interface controller configured to send and receive the data written or read to/from the memory card to/from a host computer. The memory card control method includes a step of detecting presence or absence of the memory card inserted in the insertion unit and a step of switching the memory card controller and the interface controller to a low power consumption mode in response to the absence of the memory card.

According to at least one embodiment, the memory card detector detects whether the memory card is inserted in the insertion unit and then the low power consumption mode switching unit switches the memory card controller and the interface controller to a low power consumption mode. Therefore, the switching to the low power consumption state can be achieved by only the absence of the memory card. As a result, the memory card control device by itself can switch to the low power consumption state without being controlled by the host computer, thereby the power consumption can be reduced.

According to at least one embodiment, presence or absence of the memory card inserted in the insertion unit is detected and the memory card controller and the interface controller are switched to a low power consumption mode in response to the absence of the memory card. Therefore, the memory card control device can be switched to the low power consumption mode by only the data of the presence or absence of the memory card. As a result, the memory card control device can be automatically switched to the low power consumption mode by itself without being controlled by the host computer, and the power consumption can be reduced.

BEST MODE FOR CARRYING OUT THE INVENTION

First Embodiment

Figure 1:
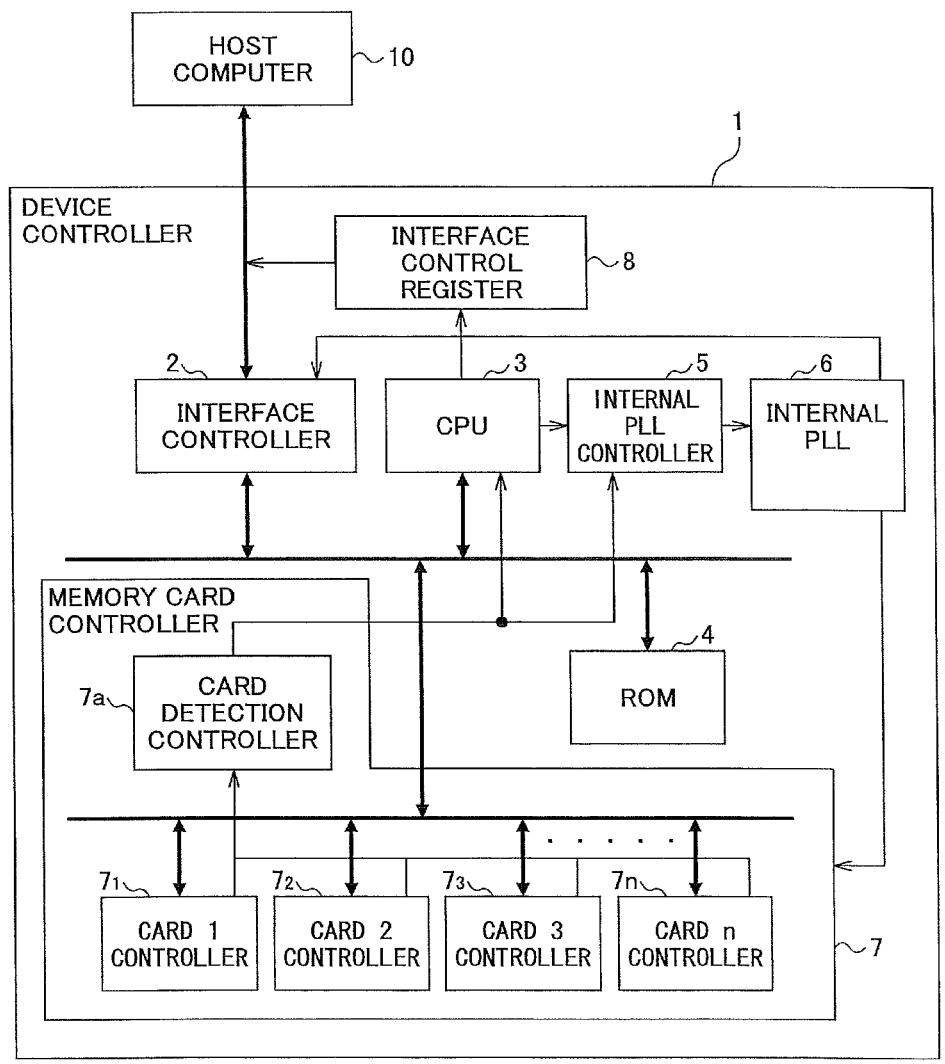
FIG. 1 is a block diagram showing a memory card control device of an embodiment of the invention.
Figure 2:
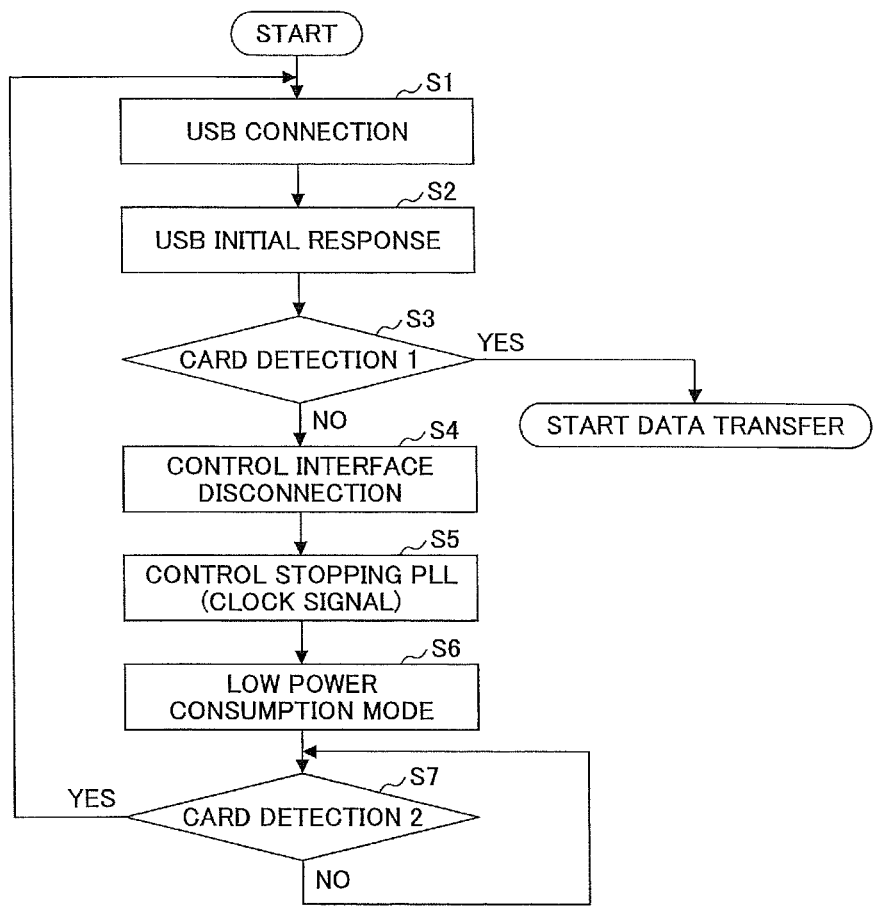
FIG. 2 is a flowchart showing a switching operation of the memory card control device to a low power consumption mode.

An embodiment of the invention will be described below with reference to FIGS. 1 and 2. FIG. 1 is a block diagram showing a memory card control device of an embodiment of the invention. FIG. 2 is a flowchart showing a switching operation of the memory card control device shown in FIG. 1 to the low power consumption mode.

A device controller 1 shown in FIG. 1 serving as the memory card control device includes an interface controller 2, a CPU 3, a ROM 4, an internal PLL controller 5, an internal PLL 6, a memory card controller 7, and an interface control register 8, and is connected to a host computer 10 through a USB interface.

The interface controller 2 communicates with the host computer 10 externally connected to the device controller 1 according to USE standards to receive data to be written to a memory card and send data read out from the memory card.

The CPU (Central Processing Unit) 3 serving as the low power consumption mode switching unit controls the interface controller 2, the memory card controller 7 which is described below, and the like, and manages overall control of the device controller 1.

The ROM 4 is a read only memory in which software, data, and the like to control the CPU 3 are stored in advance.

The internal PLL controller 5 operates as the low power consumption mode switching unit, the unit to output a signal to switch the memory card control device to the low power consumption mode, and a unit to output a signal to return the memory card control device from the low power consumption mode to the normal operation mode. By receiving a control signal from the CPU 3 or the memory card controller 7, the internal PLL controller 5 outputs a signal to the internal PLL 6 which is described below to stop and restart a clock signal supply of the internal PLL 6.

The internal PLL 6 serving as the clock supplier is a PLL (Phase Lock Loop) circuit for supplying clock signals in a predetermined frequency to the interface controller 2 and the memory card controller 7.

The memory card controller 7 serving as the memory card controller includes plural card controllers (a card 1 controller $7_1$, a card 2 controller $7_2$, a card 3 controller $7_3$, . . . , and a card n controller $7n$) and a card detection controller $7a$.

A memory card here is a memory medium in a card form, which is formed of a semiconductor memory such as a flash memory. There are plural kinds of memory cards such as SD cards and memory sticks. Each of the aforementioned plural card controllers is provided for these kinds of memory cards.

The plural card controllers (the card 1 controller $7_1$, the card 2 controller $7_2$, the card 3 controller $7_3$, . . . , and the card n controller $7n$) control writing, reading, and the like to/from the memory card inserted in a corresponding memory card insertion unit which is not shown.

The card detection controller $7a$ serving as the memory card detector outputs a signal to indicate presence or absence of the memory card to the CPU 3 and the internal PLL controller 5 in response to card insertion detection signals outputted by the plural card controllers. That is, the card detection controller $7a$ detects whether the memory card is inserted.

The interface control register 8 operates as the low power consumption mode switching unit, the unit to output a signal to switch the memory card control device to the low power consumption mode, and the unit to output a signal to return the memory card control device from the low power consumption mode to the normal operation mode. When set by the CPU 3, the interface control register 8 outputs a control signal to disconnect or connect sending and receiving of signals to/from the host computer 10 through the USB interface.

Next, a description is made on a switching operation of the device controller 1 with the aforementioned configuration to the low power consumption mode with reference to the flowchart in FIG. 2.

First, in step S1, the device controller 1 is connected to the host computer 10 through a USB cable. The operation proceeds to step S2.

In step S2, a command request from the host computer 10 is received by the interface controller 2, which then issues a response command to terminate a USB initial response. As a result, the device controller 1 is recognized by the host computer 10, whereby data transfer with a memory card can be started. The operation proceeds to step S3.

In step S3, detection of a memory card storing data to be transferred is performed. When the presence of the memory card is detected (Y of step S3), data transfer starts. When the absence of the memory card is detected (N of step S3), the operation proceeds to S4. Detecting insertion of the memory card, the card detection controller $7a$ outputs a signal indicating presence of the memory card in the insertion unit as a trigger to the internal PLL 6 through the internal PLL controller 5. Thus, the internal PLL 6 starts supplying clock signals to the memory controller 7. As a result, data transfer starts between the host computer 10 and the memory card. When the absence of the memory card in the insertion unit is detected, the memory card control device is determined to be not in use, whereby a switching operation to the low power consumption mode starts.

In step S4, the connection of the memory card control device with the host computer 10 through the USB interface is stopped (disconnected) and step S5 starts. That is, sending and receiving of data with the host computer 10 is disconnected by the interface controller 2.

Stopping connection (disconnection) with the host computer 10 is performed as follows. A USB has a Full Speed Mode and a High Speed Mode as known. In Full Speed Mode, by disabling a Pull Up resistor of a signal line DP which communicates with the host computer 10, the connection between the host computer 10 and the device controller 1 is disconnected. In High Speed Mode, by disabling termination resistors of the signal lines DP and DM, the connection between the host computer 10 and the device controller 1 is disconnected. As a result, the host computer 10 does not recognize the device controller 1. To be specific, receiving a signal indicating absence of the memory card in the insertion unit from the card detection controller $7a$, the CPU 3 writes a value (for example, 0) in the interface control register 8 to disconnect the USB connection. The interface control register 8 outputs a control signal and disables the Pull Up resistor of the signal line DP and the termination resistors of the signal lines DP and DM. Note that disabling here does not mean to physically disable the resistor, but to electrically disable the resistor.

In step S5, the clock signal supplied from the internal PLL 6 is stopped and the operation proceeds to step S6. The device controller 1 and the host computer 10 are disconnected in step S4, but not physically disconnected. Therefore, power is still supplied to the device controller 1, consuming more current. To solve this problem, a signal indicating absence of the memory card in the insertion unit is outputted from the card detection controller $7a$ to the internal PLL controller 5. Then, the internal PLL controller 5 stops the internal PLL 6, that is, the internal PLL controller 5 outputs a signal to stop the clock signal supply of the internal PLL 6. As a result, power consumption in the device controller 1 is minimized.

As the switching to the low power consumption mode is completed in step S6, step S7 starts. In response to a detection result (that the memory card is not inserted) of the memory card detector (the card detection controller 7a), the device controller 1 as a whole switches to the low power consumption mode in steps S4 and S5.

When the presence of the memory card inserted in the insertion unit is detected in step S7 (Y in step S7), the operation returns to step S1. On the other hand, the operation stands by when the absence of the memory card is detected in step S7. That is, when the presence of the memory card is detected, the card detection controller 7a outputs a signal indicating presence of the memory card in the insertion unit to the internal PLL controller 5. The internal PLL controller 5 outputs a control signal to the internal PLL 6 to restart the clock signal supply. The CPU 3 writes a value (for example, 1) indicating that the USB connection is made in the interface control register 8. Then, the interface control register 8 outputs a control signal to connect the disconnected resistors. As a result, the device controller 1 and the host computer 10 which are disconnected restart negotiation and complete the USB initial response, thereby the host computer 10 recognizes the device controller 1. Then, data transfer starts between the memory card and the host computer 10 (return to the normal operation mode).

In this embodiment, when the absence of the memory card is detected by the card controllers of the memory card controller 7 in the device controller 1 which controls writing, reading, and the like of data to/from the memory card, the card detection controller 7a outputs a signal indicating absence of the memory card in the insertion unit to the CPU 3. The CPU 3 then writes a value in the interface control register 8 to disconnect the USB connection with the host computer 10. The card detection controller 7a outputs a signal indicating absence of the memory card in the insertion unit to the internal PLL controller 5. Then, the internal PLL controller 5 stops the clock signal supply from the internal PLL 6. In this manner, the memory card control device switches to the low power consumption mode. Therefore, the switching to the low power consumption mode can be achieved by only the absence of the memory card. As a result, the memory card control device of the invention can automatically switch to the low power consumption mode by itself without being controlled by the host computer 10.

The card detection controller 7a outputs a signal indicating absence of the memory card in the insertion unit to the CPU 3, which then writes a value in the interface control register 8 to disconnect the USB connection with the host computer 10. Therefore, the memory card control device can be free from the control by the host computer 10. As a result, power consumption required for the interface controller 2 to send and receive signals to/from the host computer 10 can be reduced.

The card detection controller 7a outputs a signal indicating absence of the memory card in the insertion unit to the internal PLL controller 5 so that the internal PLL controller 5 stops the clock signal supplied from the internal PLL 6. Therefore, operations of register circuits in the interface controller 2 and the memory card controller 7 can be stopped. As a result, the power consumption can be suppressed.

The card detection controller 7a detects the presence or absence of the memory card in the insertion unit after the USB initial response between the interface controller 2 and the host computer 10 is completed. Therefore, the interface controller 2 can immediately start communication with the host computer 10 when the presence of the memory card is detected.

Second Embodiment

Figure 3:
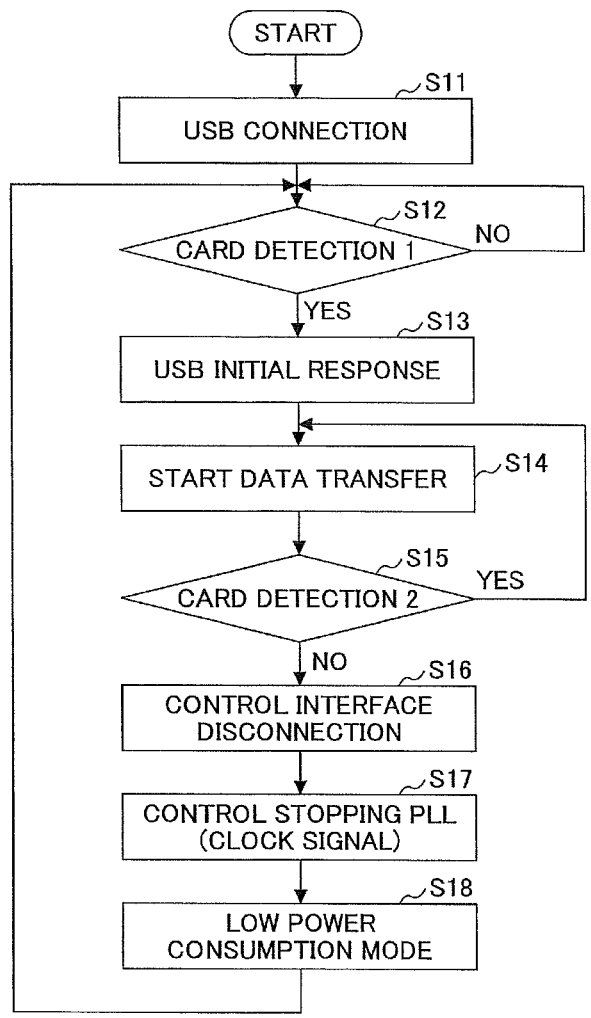
FIG. 3 is a flowchart showing a switching operation of the memory card control device to a low power consumption mode.
Figure 4:
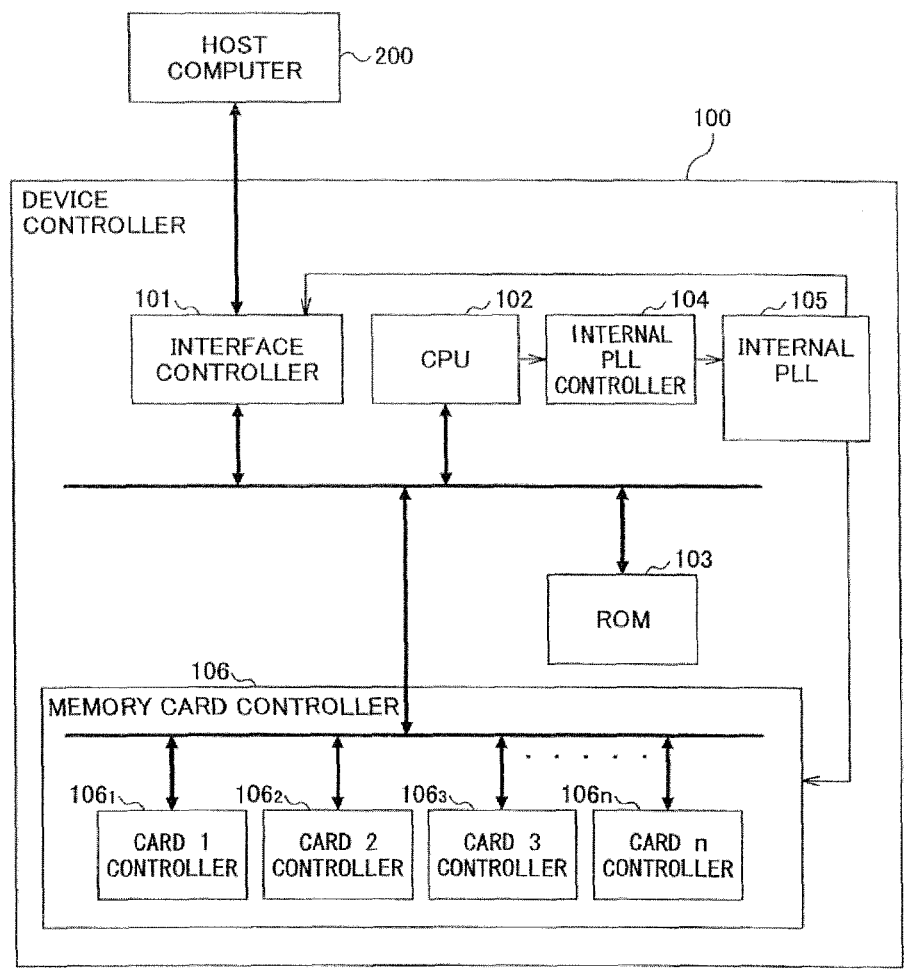
FIG. 4 is a block diagram showing a conventional memory card control device.

Next, a second embodiment of the present invention is described with reference to FIG. 3. The same components as those in the first embodiment are denoted by the same reference numerals, and description thereof are omitted. FIG. 3 is a flowchart showing a switching operation of the device controller 1 of the second embodiment to the low power consumption mode.

In this embodiment, a configuration similar to that of the first embodiment is employed. However, the flowchart of this embodiment is different from the flowchart of the first embodiment in that the detection of the memory card is performed before the USB initial response. That is to say, after the presence of the memory card inserted in the insertion unit is detected, the initial response between the host computer 10 and the interface controller starts. Hereinafter, the flowchart shown in FIG. 3 is described.

First, in step S11, the device controller 1 is connected to the host computer 10 through a USB cable, and step S12 starts.

Subsequently, when the presence of the memory card storing data to be transferred is detected (Y in step S12), step S13 starts. When the absence of the memory card is detected (N in step S12), the operation stands by in this step.

In step S13, the interface controller 2 receives a command request from the host computer 10 and then issues a response command to the host computer 10. In this manner, the USB initial response (initial response operation) is terminated and step S14 starts. As a result, the device controller 1 is recognized by the host computer 10 and becomes ready to start data transfer with the memory card.

In step S14, the data transfer is started and then step S15 starts. In step S14, the card detection controller 7a outputs a signal indicating presence of the memory card in the insertion unit as a trigger to the internal PLL 6 through the internal PLL controller 5. Thus, the internal PLL 6 starts supplying clock signals to the memory card controller 7. As a result, data transfer starts between the host computer 10 and the memory card.

Next, in step S15, when the presence of the memory card inserted in the insertion unit is detected (Y in step S15), the operation returns to step S14. When the absence of the memory card inserted in the insertion unit is detected (N in step S15), step S16 starts.

In step S16, the connection of the memory card control device with the host computer 10 at the USB interface is stopped (disconnected) and step S17 starts. That is, sending and receiving of data with the host computer 10 is disconnected by the interface controller 2.

In step S17, the internal PLL 6 is stopped. That is, the clock signal supplied from the internal PLL 6 is stopped and the operation proceeds to step S18. The device controller 1 and the host computer 10 are disconnected in step S16, but not physically disconnected. Therefore, power is still supplied to the device controller 1, consuming more current. To solve this problem, a signal indicating the absence of the memory card in the insertion unit is outputted from the card detection controller 7a to the internal PLL controller 5. Then, the internal PLL controller 5 stops the internal PLL 6. That is, the internal PLL controller 5 outputs a signal to stop the clock signal supply of the internal PLL 6. As a result, power consumption in the device controller 1 is minimized.

After the switching to the low power consumption mode is completed in step S18, the operation returns to step S12. That is, in response to a detection result (that the memory card is not inserted) of the memory card detector (the card detection controller 7a), the device controller 1 as a whole switches to the low power consumption mode in steps S16 and S17.

According to this embodiment, the USB initial response between the interface controller 2 and the host computer 10 is performed after the card detecting controller 7a detects the presence of the memory card inserted in the insertion unit. In this case, therefore, the USB initial response is not performed when the absence of the memory card is detected. As a result, power consumption for the USB initial response can be reduced when the absence of the memory card is detected.

The present invention is not limited to this embodiment, and variations and modifications may be made without departing from the scope of the present invention.

According to at least one embodiment, since the memory card detector is included in the memory card controller, the detection and the control of the memory card can be integrated. As a result, a circuit size and wiring can be reduced.

According to at least one embodiment, the low power consumption mode switching unit makes the interface controller disconnect sending and receiving of data to/from the host computer to switch the memory card controller and the interface controller to the low power consumption mode. Therefore, the memory card control device can be free from the control of the host computer. As a result, power consumption required for the interface controller to send and receive data to/from the host computer can be reduced.

According to at least one embodiment, the low power consumption mode switching unit makes the clock supplier stop supplying clock signals to switch the memory card controller and the interface controller to the low power consumption mode. Therefore, operations of register circuits in the memory card controller and the interface controller can be stopped. As a result, power consumption for the register circuits can be reduced.

According to at least one embodiment, a unit to output a signal to the low power consumption mode switching unit is provided to switch the memory card controller and the interface controller to the low power consumption mode when the memory card detector detects absence of the memory card in the insertion unit. Therefore, the switching to the low power consumption mode can be achieved by the signal outputted by only detecting the absence of the memory card.

According to at least one embodiment, a unit to output a signal to the low power consumption mode switching unit is provided to return the memory card controller and the interface controller from the low power consumption mode to a normal operation mode when the memory card detector detects presence of the memory card inserted in the insertion unit. Therefore, the return from the low power consumption state to the normal state can be achieved by a signal outputted by only detecting the presence of the memory card.

According to at least one embodiment, the memory card control device is connected to the host computer through a USB interface. Therefore, the memory card control device of the invention can be connected to computers with a USB port, which are predominant in the market.

According to at least one embodiment, the memory card detector detects the presence or absence of the memory card in the insertion unit after the initial response between the interface controller and the host computer is completed. Therefore, the interface controller can immediately start communication with the host computer when the presence of the memory card is detected.

According to at least one embodiment, the interface controller and the host computer perform an initial response operation after the memory card detector detects the presence of the memory card inserted in the insertion unit. Therefore, since the initial response operation is not performed when the absence of the memory card is detected, power consumption can be reduced.

The present application is based on Japanese Priority Application No. 2007-296556 filed on Nov. 15, 2007 and Japanese Priority Application No. 2008-279610 filed on Oct. 30, 2008, with the Japanese Patent Office, the entire contents of which are hereby incorporated by reference.

The invention claimed is:

1. A memory card control device comprising:
an insertion unit to which a memory card is inserted;
a memory card controller configured to control writing and reading of data to/from the memory card inserted in the insertion unit;
an interface controller configured to send and receive the data written or read to/from the memory card to/from a host computer via a signal line;
a clock supplier configured to supply a clock signal to the memory card controller and the interface controller;
a memory card detector configured to detect presence or absence of the memory card inserted in the insertion unit;
a low power consumption mode switching unit configured to switch the memory card controller and the interface controller to a low power consumption mode in response to the absence of the memory card detected by the memory card detector,
wherein the interface controller is connected to the host computer through a USB interface, and
wherein the low power consumption mode switching unit is configured to switch the interface controller to the low power consumption mode by electrically disconnecting the interface controller from the host computer by (i) in a case in which the USB interface is operating in a full speed mode, electrically disabling a pull-up resistor between a power supply and the signal line over which the interface controller communicates with the host computer and (ii) in a case in which the USB interface is operating in a high speed mode, electrically disabling a termination resistor on the signal line over which the interface controller communicates with the host computer.

2. The memory card control device as claimed in claim 1, wherein the memory card detector is included in the memory card controller.

3. The memory card control device as claimed in claim herein the low power consumption mode switching unit causes the interface controller to disconnect the sending and receiving of the data to/from the host computer to switch the interface controller to the low power consumption mode.

4. The memory card control device as claimed in claim 1, wherein the low power consumption mode switching unit causes the clock supplier to stop supplying the clock signal to switch the memory card controller and the interface controller to the low power consumption mode.

5. The memory card control device as claimed in claim 1, wherein the memory card control device includes a unit configured to output a signal to the low power consumption mode switching unit to switch the memory card controller and the interface controller to the low power consumption mode when the memory card detector detects absence of the memory card inserted in the insertion unit.

6. The memory card control device as claimed in claim 1, wherein the memory card control device includes a unit configured to output a signal to the low power consumption mode switching unit to return the memory card controller and the interface controller from the low power consumption mode to a normal operation mode when the memory card detector detects presence of the memory card inserted in the insertion unit.

7. The memory card control device as claimed in claim 1, wherein the memory card detector detects the presence or the absence of the memory card inserted in the insertion unit after the interface controller and the host computer perform an initial response operation.

8. The memory card control device as claimed in claim 1, wherein the interface controller and the host computer perform an initial response operation after the memory card detector detects the presence of the memory card inserted in the insertion unit.

9. A method for controlling a memory card control device including a memory card controller configured to control writing and reading of data to/from the memory card inserted in an insertion unit and an interface controller configured to send and receive the data written or read to/from the memory card to/from a host computer via a signal line, the memory card control method comprising:

(a) detecting presence or absence of the memory card inserted in the insertion unit; and (b) switching the memory controller and the interface controller to a low power consumption mode in response to the absence of the memory card, wherein the interface controller is connected to the host computer through a USB interface, and wherein switching the interface controller to the low power consumption mode includes electrically disconnecting the interface controller from the host computer by (i) in a case in which the USB interface is operating in a full speed mode, electrically disabling a pull-up resistor between a power supply and the signal line over which the interface controller communicates with the host computer and (ii) in a case in which the USB interface is operating in a high speed mode, electrically disabling a termination resistor on the signal line over which the interface controller communicates with the host computer.

* * * * *